United States Patent
Higgins

(10) Patent No.: US 11,401,653 B1
(45) Date of Patent: Aug. 2, 2022

(54) FLOOR COVERING

(71) Applicant: Higgins Research & Development, LLC, LaGrange, GA (US)

(72) Inventor: Kenneth B. Higgins, LaGrange, GA (US)

(73) Assignee: Higgins Research & Development, LLC, LaGrange, GA (US)

( * ) Notice: Subject to any disclaimer, the term of this patent is extended or adjusted under 35 U.S.C. 154(b) by 0 days.

(21) Appl. No.: 17/573,811

(22) Filed: Jan. 12, 2022

(51) Int. Cl.

| | |
|---|---|
| *B32B 37/10* | (2006.01) |
| *B32B 37/12* | (2006.01) |
| *D05C 17/02* | (2006.01) |
| *D06N 7/00* | (2006.01) |
| *B05C 11/02* | (2006.01) |
| *B05C 3/18* | (2006.01) |
| *B05D 1/42* | (2006.01) |

(Continued)

(52) U.S. Cl.
CPC ............ *D06N 7/0036* (2013.01); *B05C 3/18* (2013.01); *B05C 11/026* (2013.01); *B05D 1/42* (2013.01); *B32B 5/26* (2013.01); *B32B 37/10* (2013.01); *B32B 37/1284* (2013.01); *B32B 38/164* (2013.01); *D05C 17/023* (2013.01); *D06N 7/0039* (2013.01); *D06N 7/0081* (2013.01); *B32B 2037/1253* (2013.01); *B32B 2038/0072* (2013.01); *B32B 2305/08* (2013.01); *B32B 2305/18* (2013.01); *B32B 2471/02* (2013.01); *D05D 2305/30* (2013.01); *D06N 2211/066* (2013.01)

(58) Field of Classification Search
CPC .... B05C 1/04; B05C 1/06; B05C 3/18; B05C 11/023; B05C 11/026; B05C 11/028; B05D 1/40; B05D 1/42; B32B 5/26; B32B 5/275; B32B 27/12; B32B 37/10; B32B 37/12; B32B 37/24; B32B 2037/1253; B32B 2037/1276; B32B 38/164; B32B 2038/0072; B32B 2305/08; B32B 2305/18; B32B 2305/28; B32B 2471/02; D05C 17/02; D05C 17/023; D05D 2305/30; D06N 7/0036; D06N 7/0039; D06N 7/0071; D06N 7/0073; D06N 7/0076; D06N 7/0078; D06N 7/0081; D06N 2205/14; D06N 2211/066; D10B 2503/041
See application file for complete search history.

(56) References Cited

U.S. PATENT DOCUMENTS

| | | |
|---|---|---|
| 9,339,136 B2 | 5/2016 | Higgins |
| 9,506,175 B2 | 11/2016 | Higgins |

(Continued)

FOREIGN PATENT DOCUMENTS

WO          202158342 A1     8/2021

*Primary Examiner* — Michael A Tolin
(74) *Attorney, Agent, or Firm* — Hammer & Associates, P.C.

(57) ABSTRACT

A method of making a floor covering including a tufted textile substrate and a reinforcement backing system. A layer of reinforcement fibers is positioned on the ends of yarn stitches. Applicators are operationally connected such that adhesive is forced into the reinforcement fiber layer towards a primary backing substrate, and adhesive is also substantially simultaneously directed to form a pool of adhesive between the applicators, and a portion of the pool of adhesive is also substantially simultaneously applied as a layer of adhesive on the reinforcement fiber layer.

8 Claims, 3 Drawing Sheets

(51) Int. Cl.
*B32B 5/26* (2006.01)
*B32B 38/00* (2006.01)

(56) References Cited

U.S. PATENT DOCUMENTS

| | | |
|---|---|---|
| 9,681,768 B2 | 6/2017 | Higgins |
| 9,775,457 B2 | 10/2017 | Higgins |
| 9,924,820 B2 | 3/2018 | Higgins |
| 9,926,657 B2 | 3/2018 | Higgins |
| 10,132,019 B2 | 11/2018 | Higgins |
| 10,501,878 B2 | 12/2019 | Higgins |
| 10,920,354 B1 * | 2/2021 | Higgins ............... D05C 17/023 |
| 10,920,371 B1 | 2/2021 | Higgins |

* cited by examiner

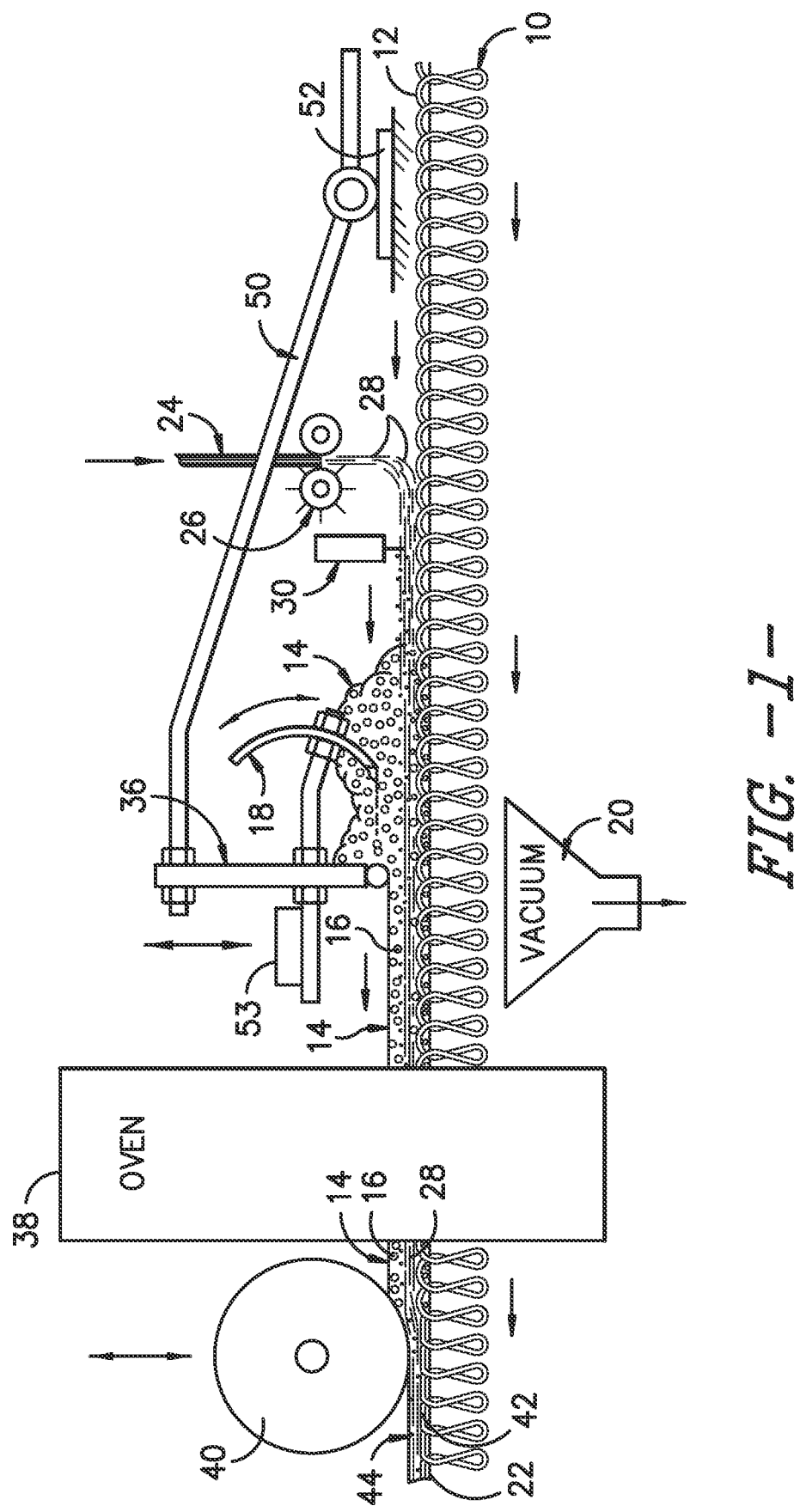
FIG. -1-

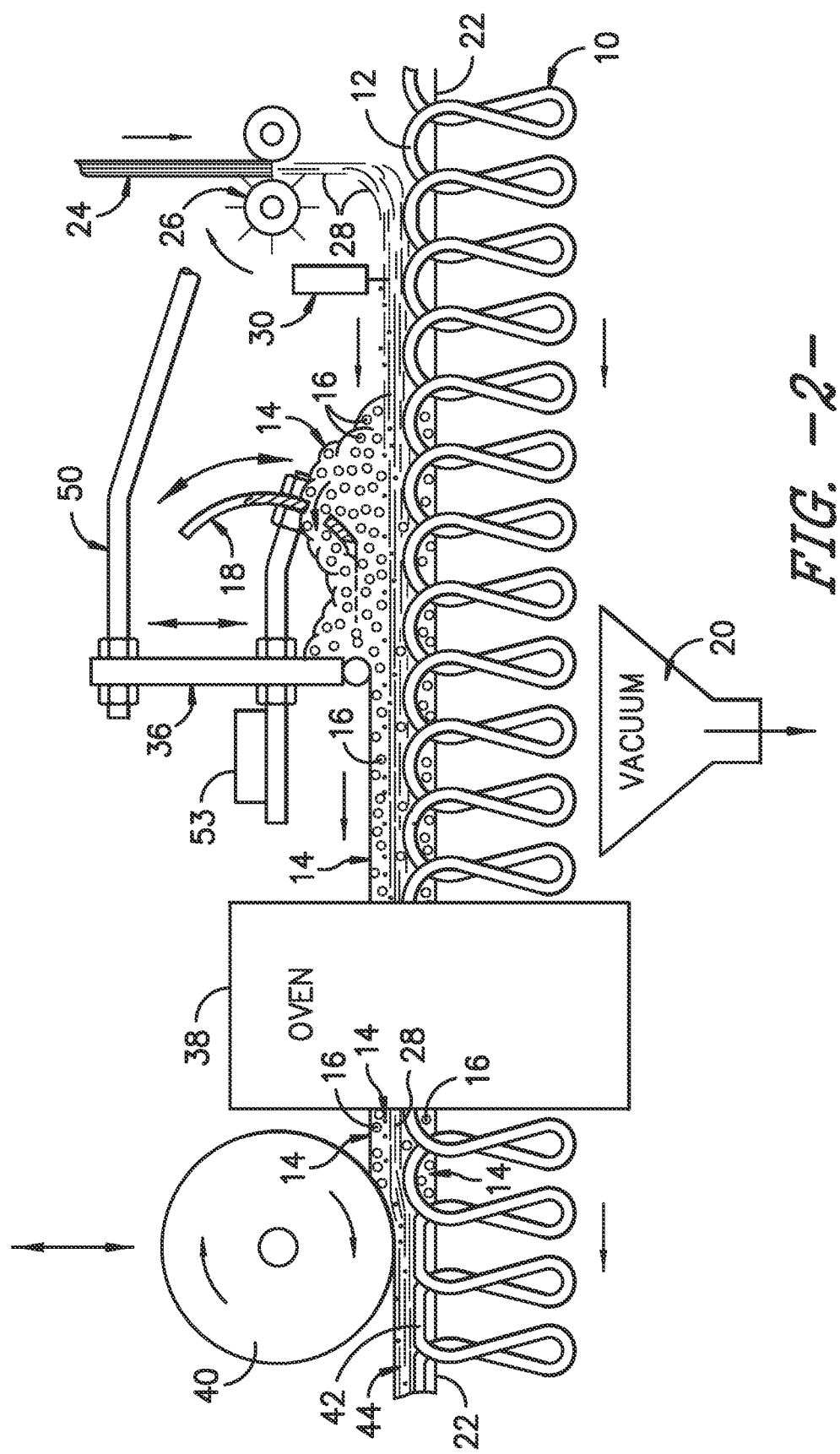
FIG. -2-

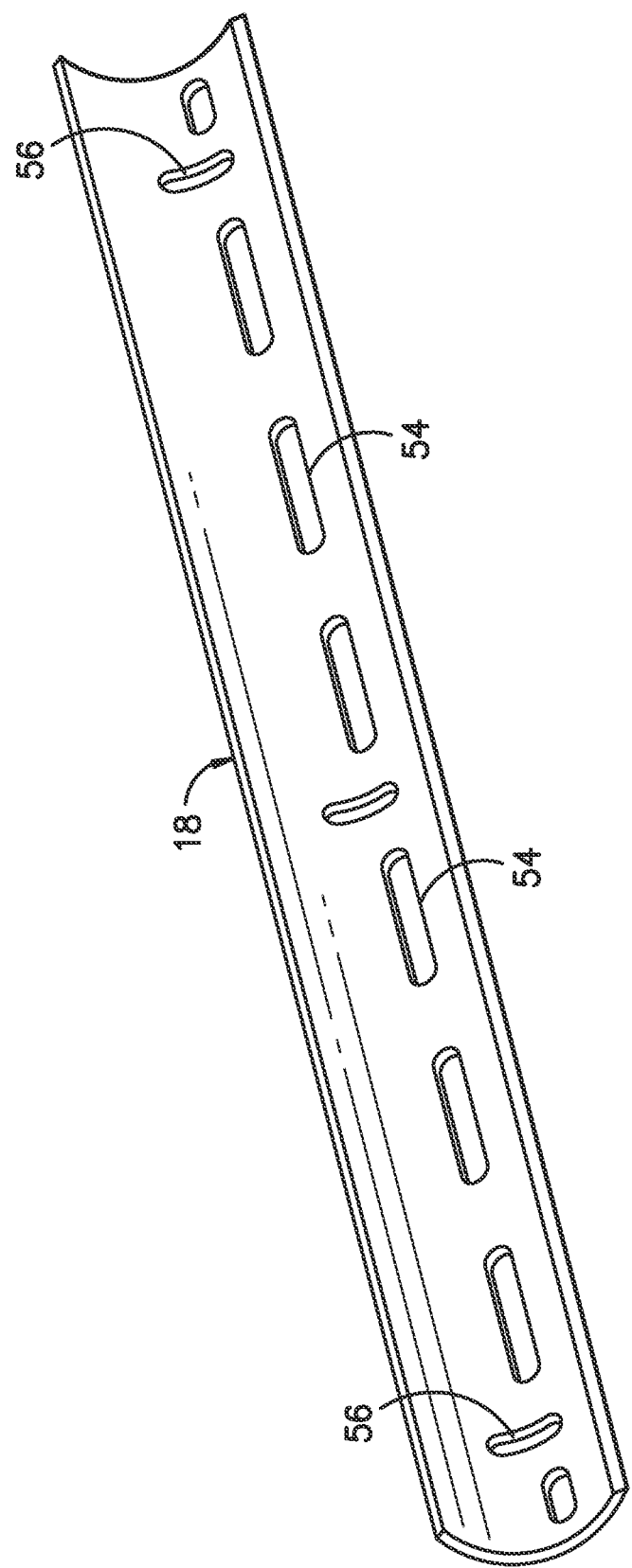
FIG. -3-

FLOOR COVERING

TECHNICAL FIELD

The present disclosure is directed to the field of textile floor coverings, such as broadloom carpet and modular carpet tiles. More particularly, according to one or more aspects provided herein, the present disclosure is directed to a floor covering including a tufted textile substrate and a reinforcement backing system.

BACKGROUND

With the advent of tufting equipment, floor covering evolved over time from woven carpet to the tufted carpets in use today. Machine tufting began with a single needle which was similar to a sewing machine. A needle carries a yarn through a primary backing substrate, which forms a stitch on the back side adjacent to the primary backing substrate. On the face side, a looper holds the yarn to a specified height above the primary backing substrate to form the pile of the carpet. The tufted yarns and the primary backing substrate collectively are referred to as a tufted textile substrate.

The single needle configuration progressed to multiple needles operating side-by-side, which is how tufted carpets are made currently. Tufting widths of sixteen feet are possible with this equipment, and when sold at these widths, the carpets are referred to in the industry as "broadloom" carpets. This type of carpet is the preferred flooring material for today's residential homes and commercial buildings.

"Modular" carpet products (carpet tiles) were introduced to address some of the problems encountered with the broadloom carpet product. Because individual tiles of an installation can be removed and replaced when soiled or worn, modular carpets were useful in applications where broadloom carpets were impractical, such as offices, airports, and other high-traffic areas.

Both broadloom and tile carpet designs have faced issues with stability and with costs of manufacturing. For example, normal broadloom carpet design has the possibility to "creep" which leads to undesirable growth. Modular tiles, with their heavy backing layers, are stiff and expensive to manufacture. As a result, there is a possibility for the modular tiles to cup or curl. Other challenges for modular tiles and broadlooms occur because of issues relating to thickness and weight variation. The manufacturers of floor coverings have significant material costs and manufacturing expenses associated with the processing and attachment of multiple backing layers and/or preformed reinforcement layers to the textile substrates.

It is known in the carpet industry that the machine direction of a carpet is the greatest contributor to dimensional stability problems. The "machine direction" is considered to be the direction in which the yarn is tufted. The yarns, which form a continuous series of loops in the machine direction, are inherently unstable especially when exposed to heat and/or moisture. Additionally, the primary backing substrates of the floor covering tend to experience more shrinkage in the machine direction. Thus, the machine direction is almost always the more unstable direction of the floor covering.

The invention set forth herein is primarily related to U.S. Pat. No. 10,920,354, and the invention is also related to the Patents referred to in the Background portion of the '354 patent. The present application discloses and claims a related method for making a carpet having a reinforcing backing system.

SUMMARY

The present invention includes a floor covering with a fiber-reinforced backing system. The floor covering may be used in broadloom products or any of a variety of modular products. The manufacturing method and resulting product includes a tufted textile substrate having a primary backing substrate and a plurality of yarns tufted through the primary backing substrate. The primary backing substrate includes a face side and a back side that is opposite to the face side with a portion of each yarn forming a stitch that is located on the back side of the primary backing substrate.

The manufacturing process includes conditioning an adhesive to form a plurality of voids within the adhesive. After conditioning, the adhesive is directed towards a first applicator which applies pressure in a controlled manner to force the adhesive towards the back side of the primary backing substrate. The adhesive is forced into and between the stitches which are located on the back side of the primary backing substrate. The movement of the adhesive is controlled by the first applicator and by a vacuum that is applied at the face side of the primary backing substrate.

Before applying the conditioned adhesive, spaced apart bundles of reinforcement fibers are selectively cut to form a plurality of separate reinforcement fibers having a desired length. The cut reinforcement fibers are disbursed and arranged into a desired pattern on the ends of the yarn stitches as the yarn stitches move in the machine direction. The disbursing and arranging of the reinforcement fibers results in the formation of a patterned layer of reinforcement fibers which lays on the ends of the yarn stitches.

After the patterned layer of reinforcement fibers is formed on the ends of the yarn stitches, adhesive is applied against the first applicator. In the preferred embodiment, adhesive passes through the first applicator as the first applicator forces adhesive towards the back side of the primary backing substrate. A second applicator forces adhesive to cover the patterned layer of reinforcement fibers. The first and second applicators are spaced apart, and they are operatively connected. They also form a space and housing for a pool of adhesive that is formed from the adhesive that passes through the first applicator.

Three steps occur substantially simultaneously after the patterned layer of reinforcement fibers is positioned on the ends of the yarn stitches. The first step is forcing adhesive into the patterned layer of reinforcement fibers towards the back side of the primary backing substrate. The second step is forcing adhesive to form a pool of adhesive in the space between the first and second applicators. The third step is using the second applicator to form a cover layer of adhesive on the patterned layer of reinforcement fibers, where the adhesive for the cover layer of adhesive comes from the pool of adhesive between the first and second applicators.

The resulting adhesive and reinforcement fibers combination may be passed through an oven to dry, condition, or cure. The drying, conditioning, or curing provided by the oven does not eliminate the plurality of voids in the adhesive, and the drying of the combination assists in providing adhesive rigidity.

After passing through an oven, an embosser applies pressure in a controlled manner against the adhesive and reinforcement fibers combination. It is compressed by the embosser, and the ends of the yarn stitches are flattened. The compression, provided by the embosser, collapses the adhesive. The collapsing of the adhesive removes the volume occupied by the voids in the adhesive. This results in the formation of a thinner and relatively solid structure. The reinforcement fibers are also simultaneously moved by the embosser into engagement and attachment with the flattened end surfaces of the yarn stitches and into a final location that is positioned closer to the primary backing substrate.

These and other features and advantages of the present invention will be better understood with reference to the following description and appended claims. The accompanying drawings, which constitute a part of the present specification, illustrate various embodiments of the invention, and together with the written description, explain the principles of the inventive methods and products.

BRIEF DESCRIPTION OF THE DRAWINGS

A full and enabling disclosure of the present methods and resulting product, including the best mode thereof, directed to one of ordinary skill in the art, is set forth in the specification, which makes reference to the appended figures, in which:

FIG. 1 is a schematic diagram of an equipment arrangement for attaching a fiber and adhesive reinforcement backing to a tufted textile substrate.

FIG. 2 is an enlarged schematic diagram of an equipment arrangement for illustrating the present invention for attaching a fiber and adhesive reinforcement backing to a tufted textile substrate.

FIG. 3 is a perspective view of the first applicator.

DETAILED DESCRIPTION

Reference will now be made to the embodiment of the method and equipment of the present invention, one or more examples of which are illustrated in the drawings. Each example is provided by way of explanation of the invention and not a limitation of the invention. It will be apparent to one of ordinary skill in the art that various modifications and variations can be made in the present invention without departing from the scope or spirit of the invention. Thus, it is intended that the present invention covers such modifications and variations as fall within the scope of the appended claims and their equivalents.

FIG. 1 is a schematic diagram, in accordance with the present invention, of an arrangement for applying adhesive and reinforcing fibers to a tufted textile substrate to form a reinforcing backing system. The floor covering includes a tufted textile substrate 10 made of yarns that are tufted through a primary backing substrate 22. As is known, the primary backing substrate 22 has a face side and a back side that is opposite to the face side. The yarns form stitches 12 on the back side of the primary backing substrate 22 and an interstitial space exists between each yarn.

The manufacturing process disclosed herein begins by conditioning an adhesive 14 to form a plurality of voids 16 within the adhesive 14. In a preferred embodiment, adhesive 14 is a thermoplastic adhesive. It is preferred that adhesive 14 have the characteristics of being malleable and reformable when it is exposed to heat or compression. It is also preferred that the adhesive 14 be water based for assisting in the manufacturing process as will be described further. For example, air may be injected into a water based adhesive 14 to create voids in the form of air bubbles for the purpose of allowing a desired compression of the adhesive 14 during the manufacturing process.

After conditioning adhesive 14 to establish voids 16, the adhesive 14 may be engaged by the first applicator 18, in a controlled manner, to force adhesive 14 towards the back side of the primary backing substrate 22. Adhesive 14 is forced into the stitches 12, and it is also forced into the spaces between the stitches 12. The movement of adhesive 14 is further controlled by a vacuum 20 that is applied at the face side of the primary backing substrate 22. Applicator 18 and vacuum 20 form a layer of the adhesive 14 with the layer of adhesive 14 having a desired thickness and with the layer of adhesive 14 being movable in the machine direction.

Referring to FIG. 1, one or more bundles 24 of reinforcement fibers 28 are positioned relative to the moving stitches 12 and moving primary backing substrate 22. A cutting mechanism 26 cuts fiber bundle(s) 24 into a plurality of separate reinforcement fibers 28, Each reinforcement fiber 28 is cut into a desired length. The cut reinforcement fibers 28 are disbursed and arranged into a desired pattern by a dispersing and arranging device 30.

The disbursing and arranging device 30, for the reinforcement fibers 28, is schematically illustrated in FIGS. 1-2. After being cut from the bundle(s) 24, the cut reinforcement fibers 28 are positioned in a machine direction configuration, FIGS. 1-2 illustrate one example of the generally machine direction configuration of the reinforcement fibers 28 on the ends of stitches 12 after the fibers 28 have been cut from bundle(s) 24.

After the reinforcement fibers 28 are initially positioned into a configuration that is generally in the machine direction, the disbursing and arranging device 30 is used to arrange the cut reinforcement fibers 28 into a desired pattern. For example, the desired pattern may include the positioning of reinforcement fibers 28 in the machine direction and the positioning of reinforcement fibers at various other angles relative to the machine direction. Further, the reinforcement fibers 28 have a sufficient length to permit bending or curling of the fibers 28 such that the bent or curled fibers 28 extend in more than one direction.

The reinforcement backing, consisting of reinforcement fibers 28 and adhesive 14, may be passed through an oven 38 to dry, condition, or cure the reinforcement backing. It is intended that the drying, conditioning, or curing provided by oven 38 will not eliminate the voids 16 in the adhesives 14. The drying treatment provided by oven 38 removes water and provides a desirable adhesive rigidity. Since the preferred adhesive is a water-based thermoplastic that contains, for example, air voids, it is desirable to remove the water from the adhesive and to dry the adhesive for providing some rigidity to it while allowing the adhesive to remain malleable and reformable.

As shown in FIGS. 1 and 2, after passing through the oven 38, a third applicator 40 applies pressure in a controlled manner against the reinforcement backing consisting of reinforcement fibers 28 and adhesive 14. The third applicator 40 can be an embosser which compresses the adhesive 14 and reinforcement fibers 28 (as shown at 44), and flattens the ends of the stitches 12 (as shown at 42).

The compression provided by the third applicator 40, collapses the relatively rigid layer of dried adhesive 14 as shown at 44. The compressing and collapsing actions reduce the volume occupied by the voids 16 in the layer of adhesive 14. This results in the formation of a thinner and relatively solid structure 44 consisting of compressed and collapsed adhesive 14 and reinforcement fibers 28. The resulting layer 44 of reinforcement fibers 28 and adhesive 14 is also simultaneously moved by the third applicator 40 into engagement and attachment with the flattened end surfaces 42 of the yarn stitches 12. Further, as shown in FIGS. 1 and 2, the layer 44 of reinforcement fibers 28 and adhesive 14 is moved into a final location that is close to or in engagement with the primary backing substrate 22.

FIGS. 1 and 2 illustrate the application assembly 50 for the present invention, which forces adhesive 14 towards the primary backing substrate 22 and substantially simultaneously covers the reinforcement fibers 28 with adhesive 14. In the disclosed embodiment, application assembly 50 is attached at 52 for supporting the first applicator 18 and the second applicator 36, so that they are spaced from the primary backing substrate 22. Further, the first and second applicators, 18 and 36, are operatively connected to each other as schematically illustrated in FIGS. 1 and 2, and as will be more fully described.

Applicator 18 is selectively movable toward and away from the primary backing substrate 22. Applicator 18 includes a balancing weight 53 such that the heavier weight of applicator 18 allows applicator 18 to move towards the primary backing substrate 22, and the lighter balancing weight 53 allows the end of applicator 18 to float on or near to a layer of reinforcement fibers 28. When the applicator 18 is selectively set at its operating position, the end of the applicator 18 is typically set to engage the reinforcement fibers 28.

As described previously, the cut reinforcement fibers 28 are initially dispersed onto the moving ends of the yarn stitches 12, The reinforcement fibers 28 are formed or patterned into a layer of reinforcement fibers 28. The conditioned adhesive 14 is applied against one side of applicator 18, and applicator 18, with controlled pressure being applied, forces adhesive 14 into the stitches 12, and applicator 18 also forces adhesive 14 into the spaces between the stitches 12.

Referring now to FIGS. 2 and 3, the first applicator 18 includes at least one opening or passageway to permit adhesive 14 to pass through it from one side of applicator 18 to its opposite side. The adhesive 14 passes through the at least one opening, and almost simultaneously forms a pool of adhesive between the applicators 18 and 36. The pool of adhesive that is formed, is also substantially simultaneously applied to cover the reinforcement fibers 28 as shown in FIG. 2.

FIG. 3 illustrates the curved first applicator 18 with different orientations and sizes of openings 54 and 56. These opening shapes, sizes, and locations are only exemplary of ways to allow adhesive 14 to pass through applicator 18 to form the pool of adhesive that is used to cover the reinforcement fibers 28, as described.

As described and illustrated in FIGS. 1 and 2, the first applicator 18 and the second applicator 36 are operatively constructed, connected, and controlled to substantially simultaneously: (a) force a portion of adhesive 14 through a layer of reinforcement fibers 28 towards the back side of the primary backing substrate 22; (b) force a portion of adhesive 14 though a passageway in the first applicator 18 to form a pool of adhesive 14 in the space between the first and second applicators 18 and 36; and (c) use the second applicator 36 to form a cover layer of adhesive 14 on the layer of reinforcement fibers 28.

The end of the first applicator 18 may be initially set into a preferred position that engages or is near to the layer of reinforcement fibers 28. The second applicator 36 is positioned such that the end of the first applicator 18 is closer to the reinforcement fibers 28 than the distance between the end of the second applicator 36 and the reinforcement fibers 28. That is, a gap is formed between the end of the first applicator 18 and the end of the second applicator 36. Further, the surfaces of the applicators 18 and 36 create a housing for the pool of adhesive 14 that flows through the passageway opening in the first applicator 18.

Together, the gap between the ends of the applicators 18 and 36; the opening or passageway through applicator 18; and the creation of a housing between the operatively connected applicators 18 and 36, allows for the substantially simultaneous forcing of adhesive 14 through the reinforcement fibers 28 towards the primary backing substrate 22 and the formation of an adhesive cover on the reinforcement fibers 28.

Moreover, since the tip of applicator 18 may float on the reinforcement fibers 14, e.g., up and down, and since the gap between the ends of the first and second applicators 18 and 36 is fixed or does not change after it is set, any movement by the first applicator 18, towards or away from the primary backing substrate 22, is automatically transferred to a similar movement by the end of the second applicator 36, as a result of the applicators being operatively connected together to maintain the same preset gap between them.

As stated previously, a pool of adhesive 14 is formed between the operatively connected applicators 18 and 36. The size, shape, or volume of the formed pool of adhesive 14, is selectively variable depending on factors, including the location of the passageway through applicator 18; the gap distance between applicators 18 and 36; or the speed of movement by the primary backing substrate 22. The pool of adhesive 14 is controlled to provide the required amount of adhesive 14 that is necessary for applicator 36 to form a desired cover on the reinforcement fibers 28 substantially simultaneous with the forcing of adhesive 14 into the interstitial spaces between the yarn stitches 12.

The present invention may be embodied in other forms without departing from the spirit and the essential attributes thereof, and, accordingly, references should be made to the appended claims, and not just to the foregoing specification, as indicative of the scope of the invention.

What is claimed is:

1. A method of manufacturing a floor covering, the method comprising the steps of:

manufacturing the floor covering from a group of components including a tufted textile substrate having a primary backing substrate extending in a first direction and a plurality of yarns tufted through the primary backing substrate, the primary backing substrate having a face side and a back side opposite to the face side, a portion of each yarn forming a stitch portion having an end that is located on the back side of the primary backing substrate, and spaces existing between the stitch portions;

forming a layer of reinforcement fibers on the ends of the stitch portions, and moving said layer of reinforcement fibers in said first direction;

operably connecting a first applicator to a second applicator and forming a housing for a pool of adhesive, said first and second applicators being movable towards said layer of reinforcement fibers, and providing a passageway in said first applicator for allowing the formation of said pool of adhesive; and applying controlled pressure with said first applicator to force adhesive into and between the stitch portions on the back side of the primary backing substrate, substantially simultaneously using said passageway for forming said pool of adhesive in said housing, and substantially simultaneously forming, with the second applicator, a cover layer of adhesive on the layer of reinforcement fibers.

2. The method of manufacturing a floor covering according to claim 1 further comprising compressing the adhesive and simultaneously moving the layer of reinforcement fibers toward the primary backing substrate.

3. The method of manufacturing a floor covering according to claim 2 further comprising drying the adhesive before compressing the adhesive to provide rigidity for the adhesive.

4. A method of manufacturing a floor covering, the method comprising the steps of:
- manufacturing the floor covering from a group of components including a tufted textile substrate having a primary backing substrate, said primary backing substrate being moved in a first direction, and a plurality of yarns tufted through the primary backing substrate, the primary backing substrate having a face side and a back side opposite to the face side, a portion of each yarn forming a stick portion having an end that is located on the back side of the primary backing substrate, and spaces existing between the stitch portions;
- forming a layer of reinforcement fibers on the ends of the stitch portions and moving said layer of reinforcement fibers in said first direction;
- operably connecting a first applicator to a second applicator and forming a housing for a pool of adhesive, said first and second applicators being movable towards said layer of reinforcement fibers, and providing a passageway for allowing adhesive to pass the first applicator and forming said pool of adhesive between said first and second applicators; and
- floating said first applicator on said layer of reinforcement fibers, applying controlled pressure with said first applicator to force adhesive into and between the stitch portions, maintaining a gap between said first and second applicators, substantially simultaneously using said passageway for forming a pool of adhesive in said housing, and substantially simultaneously forming, with the second applicator, a cover layer of adhesive over the layer of reinforcement fibers.

5. The method of manufacturing a floor covering according to claim 4 further comprising compressing the adhesive and moving the layer of reinforcement fibers towards the primary backing substrate.

6. The method of manufacturing a floor covering according to claim 5 further comprising drying the adhesive before compressing the adhesive to provide rigidity to the adhesive.

7. The method of manufacturing a floor covering according to claim 4 further comprising disbursing and arranging the reinforcement fibers and forming a patterned layer of reinforcement fibers.

8. A method of manufacturing a floor covering, the method comprising the steps of:
- manufacturing the floor covering from a group of components including a tufted textile substrate having a primary backing substrate, moving said primary backing substrate in a first direction, and a plurality of yarns tufted through the primary backing substrate, the primary backing substrate having a face side and a back side opposite to the face side, a portion of each yarn forming a stitch portion having an end that is located on the back side of the primary backing substrate, and spaces existing between the stitch portions;
- forming a plurality of voids in an adhesive;
- forming a layer of reinforcement fibers on the ends of the stitch portions, arranging the reinforcement fibers to form a patterned layer of reinforcement fibers, and moving said patterned layer of reinforcement fibers in said first direction;
- operatively connecting a first applicator to a second applicator and forming a housing for a pool of said adhesive, said first and second applicators having ends which are spaced from the layer of reinforcement fibers, forming a gap between the ends of said applicators, and said first applicator providing a passageway for allowing said adhesive to move past the first applicator for forming said pool of adhesive between said first and second applicators;
- floating said first applicator on said layer of reinforcement fibers and applying controlled pressure with said first applicator to force adhesive into and between the stitch portions, maintaining said gap between said ends of said first and second applicators, substantially simultaneously using said passageway for allowing adhesive to pass the first applicator and forming said pool of adhesive, and substantially simultaneously forming, with said second applicator, a cover layer of said adhesive over the layer of reinforcement fibers;
- curing the layer of adhesive without eliminating the voids in the adhesive; and
- compressing the layer of adhesive and simultaneously collapsing the voids in the adhesive and moving the layer of reinforcement fibers towards the primary backing substrate.

* * * * *